United States Patent
Kim

(10) Patent No.: US 7,829,187 B2
(45) Date of Patent: Nov. 9, 2010

(54) MOLD FOR OPTICAL PLATE AND MANUFACTURING METHOD THEREOF, AND OPTICAL PLATE AND MANUFACTURING METHOD THEREOF

(75) Inventor: Tae-seok Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 11/830,418

(22) Filed: Jul. 30, 2007

(65) Prior Publication Data
US 2008/0026200 A1 Jan. 31, 2008

(30) Foreign Application Priority Data
Jul. 31, 2006 (KR) .................. 10-2006-0072356

(51) Int. Cl.
*B32B 3/26* (2006.01)
(52) U.S. Cl. .......... 428/318.4; 428/319.1; 428/457; 428/141; 428/148; 428/688; 428/689; 428/119
(58) Field of Classification Search ............ None
See application file for complete search history.

(56) References Cited

U.S. PATENT DOCUMENTS 5,411,686 A * 5/1995 Hata .................. 264/40.6
2002/0181224 A1* 12/2002 Tahara et al. ............. 362/31

FOREIGN PATENT DOCUMENTS

| JP | 2003-14938 | 1/2003 |
|---|---|---|
| JP | 2004-271635 | 9/2004 |
| KR | 1020040033971 | 4/2004 |

* cited by examiner

Primary Examiner—Ling Xu
(74) Attorney, Agent, or Firm—F. Chau & Associates, LLC

(57) ABSTRACT

A mold for an optical plate includes a first core having a first surface; a second core opposite to the first core to form a molding space and having a second surface, the first surface and the second surface defining the molding space; and a specular layer formed on at least one of the first surface or the second surface.

11 Claims, 8 Drawing Sheets

MOLD FOR OPTICAL PLATE AND MANUFACTURING METHOD THEREOF, AND OPTICAL PLATE AND MANUFACTURING METHOD THEREOF

CROSS-REFERENCE TO RELATED APPLICATION

This application claims priority to Korean Patent Application No. 2006-0072356, filed on Jul. 31, 2006, the disclosure of which is incorporated herein by reference in its entirety.

BACKGROUND OF THE INVENTION

1. Technical Field

The present disclosure relates to a mold for an optical plate and a manufacturing method thereof, and more particularly to a mold for an optical plate with reduced defects and a manufacturing method thereof.

2. Discussion of the Related Art

An injection molding apparatus is employed to manufacture a desired-shaped injection product from a mixture of a molding material, such as thermoplastic resin, and various additives of a melting state in a molding space formed by a mold or a core.

The injection molding apparatus comprises a first core, a second core, a runner, a gate, and at least one flow channel. The second core moves up and down with respect to the first core and forms a molding space along with the first core. The runner and the gate are disposed between the first core and the second core and inject a molding material to the molding space. The at least one flow channel is provided in each of the first core and the second core. The first core and the second core cooperate to form a shape of the injection product.

The injection product formed by the first and second cores to have a predetermined shape is solidified by cooling water through the flow channel, and then ejected from the first and second cores.

A light guiding plate and a diffusing plate used for a liquid crystal display (LCD) are manufactured by the injection molding apparatus. The light guiding plate guides light from a light source to an LCD panel and may comprise bubbles scattered therein. The bubbles are formed by injecting gas into the molding material. The light passing through the light guiding plate is uniformly diffused to the LCD panel by the bubbles.

However, traces of a flow may be formed on a surface of the light guiding plate due to the gas used for generating the bubbles, and the bubbles may not be disposed in the light guiding plate but be exposed to a surface to cause outward defects of the light guiding plate.

SUMMARY OF THE INVENTION

Embodiments of the present invention provide a mold for an optical plate and a manufacturing method thereof to minimize an outward defect of an injection product.

Embodiments of the present invention provide an optical plate and a manufacturing method thereof to minimize an outward defect and to improve an optical performance.

According to an embodiment of the present invention, a mold for an optical plate comprises: a first core having a first surface; a second core opposite to the first core to form a molding space and having a second surface, the first surface and the second surface defining the molding space; and a specular layer formed on at least one of the first surface or the second surface.

According to an embodiment of the present invention, the specular layer comprises metal.

According to an embodiment of the present invention, the specular layer comprises at least one of gold, silver, aluminum, copper or nickel.

According to an embodiment of the present invention, the specular layer is about 200 μm to about 300 μm in thickness.

According to an embodiment of the present invention, a surface of the specular layer to face the molding space is substantially flat by polishing.

According to an embodiment of the present invention, at least one of the first core and the second core comprises ceramic.

According to an embodiment of the present invention, at least one of the first core or the second core comprises a body and a ceramic layer to cover the body, and the specular layer is formed on the ceramic layer.

According to an embodiment of the present invention, a coolant flow channel is provided in at least one of the first core or the second core.

According to an embodiment of the present invention, the mold for the optical plate further comprises a pattern forming part formed on the specular layer.

According to an embodiment of the present invention, a grooved dot pattern or a grooved prism is formed on the pattern forming part.

According to an embodiment of the present invention, the mold for the optical plate further comprises a pair of core blocks which is disposed at a lateral side of the first core and the second core.

According to an embodiment of the present invention, the mold for the optical plate further comprises a gate to inject resin to the molding space, wherein the gate is provided at least one of the core blocks.

According to an embodiment of the present invention, a manufacturing method of a mold for an optical plate comprising a molding space, comprises: preparing a core by chamfering a ceramic material; grinding a surface of the core to face the molding space; polishing the surface of the core which is ground; forming a specular layer on the surface of the core which is polished; grinding the specular layer; and polishing the specular layer which is ground.

According to an embodiment of the present invention, the forming the specular layer and the grinding and polishing the specular layer are repeated more than twice.

According to an embodiment of the present invention, the specular layer comprises at least one of gold, silver, aluminum, copper or nickel.

According to an embodiment of the present invention, the specular layer is about 200 μm to about 300 μm in thickness.

According to an embodiment of the present invention, the manufacturing method of the mold for the optical plate further comprises forming a pattern forming layer on the specular layer, wherein a grooved dot pattern or a grooved prism are provided on the pattern forming part.

According to an embodiment of the present invention, a manufacturing method of an optical plate comprises: injecting resin into a molding space which is formed by the mold for the optical plate; injecting gas into the molding space; and solidifying the resin, a temperature of the resin being substantially uniform in the molding space in the solidifying the resin.

According to an embodiment of the present invention, a variation of the resin temperature in the molding space is substantially within 10° C.

According to an embodiment of the present invention, the resin comprises acrylic resin.

According to an embodiment of the present invention, the resin comprises at least one of Polymethylmethacrylate (PMMA), Polycarbonate (PC), Styrene acrylonitrile (SAN) or Methyl-styrene (MS).

According to an embodiment of the present invention, the gas comprises at least one of carbon dioxide or nitrogen.

According to an embodiment of the present invention, the gas is in the supercritical state.

According to an embodiment of the present invention, an optical plate comprises: a core where a plurality of bubbles are dispersed; and a surface layer which covers at least a portion of the core and comprises the bubbles of relatively low density compared with the density of the bubbles in the core, a surface of the surface layer being substantially flat.

According to an embodiment of the present invention, the ratio of the density of the bubbles in the surface layer to in the core is more than 1:100.

According to an embodiment of the present invention, the bubbles are 5 μm to 50 μm in diameter.

According to an embodiment of the present invention, the bubbles comprises at least carbon dioxide or nitrogen.

BRIEF DESCRIPTION OF THE DRAWINGS

Exemplary embodiments of the present disclosure can be understood in more detail from the following description taken in conjunction with the accompanying drawings of which.

DETAILED DESCRIPTION OF EXEMPLARY EMBODIMENTS

Exemplary embodiments of the present invention will be described in more detail with reference to the accompanying drawings. The present invention may, however, be embodied in many different forms and should not be construed as limited to the embodiments set forth herein.

Figure 1:
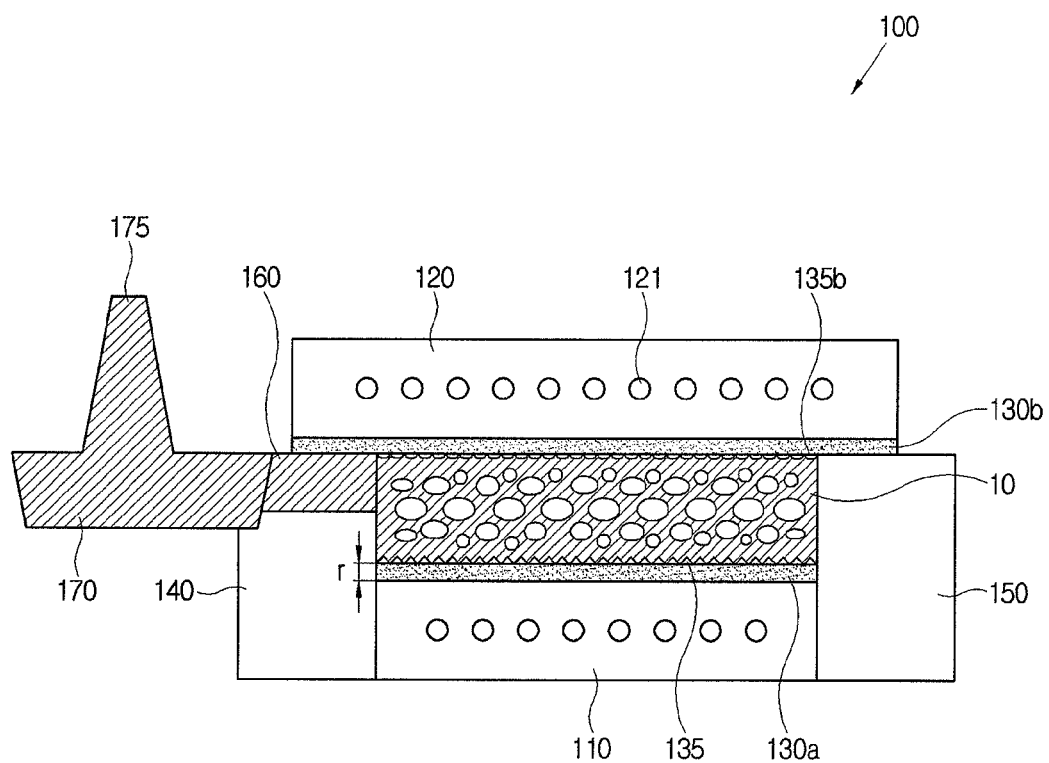
FIG. 1 is a sectional view of an injection molding apparatus according to an exemplary embodiment of the present invention.

Referring to FIG. 1, an injection molding apparatus 100 according to an exemplary embodiment of the present invention comprises a first core 110, a second core 120 opposite the first core 110, and a pair of core blocks 140 and 150 disposed at opposite lateral sides of the first core 110 and the second core 120. The first core 110, the second core 120 and the pair of the core blocks 140 and 150 form a molding space S. A gate 160 formed at a lateral side of the core block 140 is provided to receive resin from an outside resin supplier (not shown) to inject the resin into the molding space S. The first core 110, the second core 120 and the core blocks 140 and 150 form a mold to form an injection product that may be used as an optical plate, such as a light guiding plate or a diffusing plate.

Figure 2:
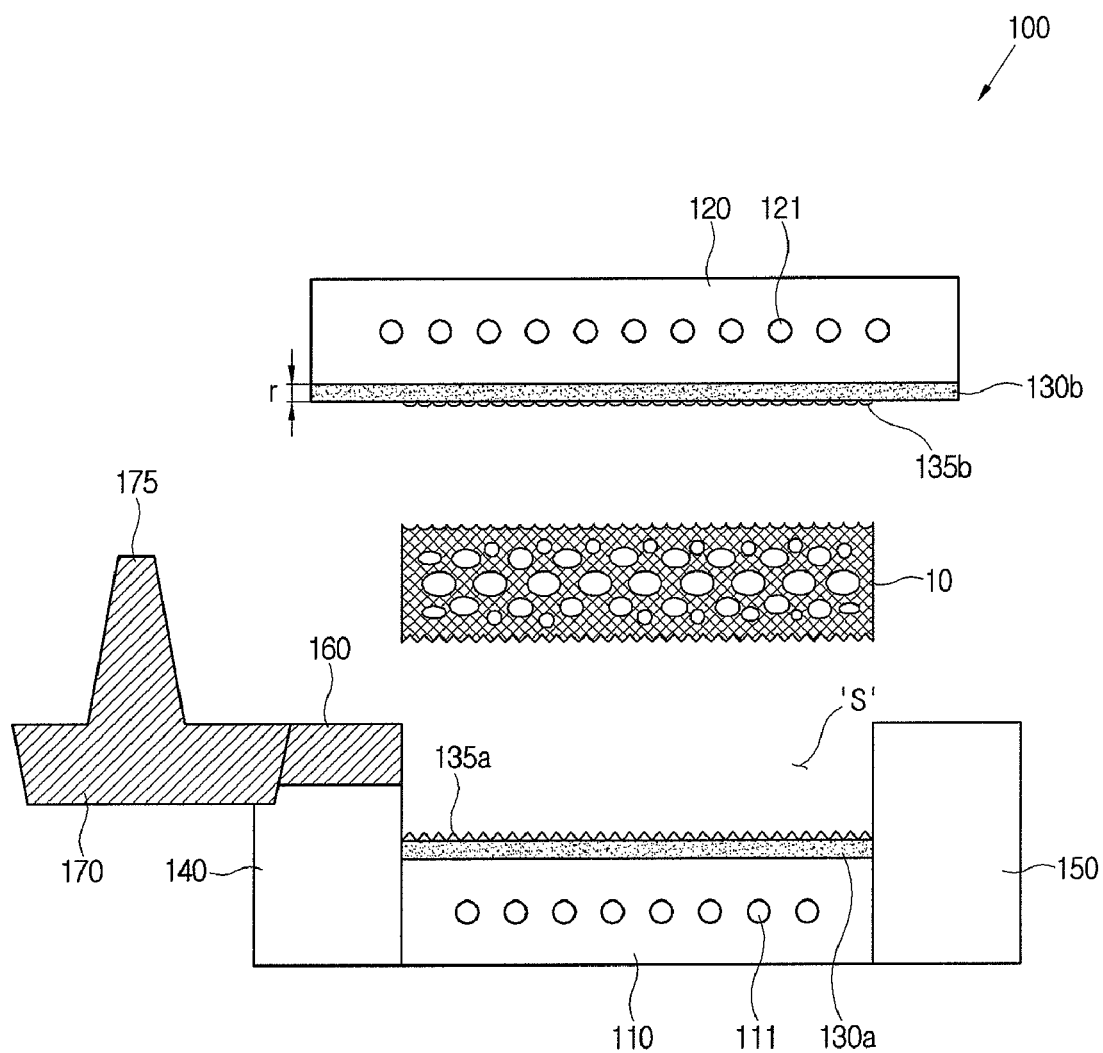
FIG. 2 illustrates a method of ejecting an injection product from the injection molding apparatus according to an exemplary embodiment of the present invention.

The first core 110 is fixed, and the second core 120 moves up and down with respect to the first core 110. Referring to FIG. 2, when the injection product 10 is completed, the second core 120 moves up to eject the injection product 10 and an ejecting pin (not shown) pushes up the injection product 10 to be separated from the first core 110. Coolant flow channels 111 and 121 are provided respectively in at least one of the first and the second cores 110 and 120 to solidify the resin in the molding space S. Further, the first and the second cores 111 and 121 may include ceramic with good heat-insulation characteristics. The ceramic is provided to constantly maintain a temperature of the resin in the overall molding space S, thereby minimizing an outward defect on of the injection product 10 that may be formed by the bubbles in the injection product 10 while solidifying the injection product 10.

Each of the first core 110 and the second core 120 comprises a first surface and a second surface which face the molding space S and specular layers 130a and 130b. The specular layers 130a and 130b are formed on the first surface and the second surface respectively. The specular layers 130a and 130b include metal, for example, at least one of gold (Au), silver (Ag), aluminum (Al), copper (Cu) and nickel (Ni). The metal can be ground and polished to have a substantially flat and fine surface. In an exemplary embodiment, the specular layers 130a and 130b are about 200 μm to about 300 μm in thickness r and formed by, for example, plating or vapor deposition. If the thickness r of the specular layers 130a and 130b is less than about 200 μm, grinding and polishing of the specular layers 130a and 130b can be difficult. If the thickness r of the specular layers 130a and 130b is more than about 300 μm, forming the specular layers 130a and 130b can be a time-consuming process.

The first and the second cores 110 and 120 comprise pattern forming layers 135a and 135b formed on the specular layers 130a and 130b, respectively. The pattern forming layers 135a and 135b include a pattern corresponding to a pattern to be formed on a surface of the injection product 10. In an exemplary embodiment, a grooved dot pattern is provided on a specular layer 130a, and a groove prism pattern is provided on a specular layer 130b. Thus, a dot pattern is formed on a first surface of the injection product 10, and a prism pattern is formed on a second surface of the injection product 10. In an exemplary embodiment, the pattern forming layer 130a and 130b may be omitted.

The pair of core blocks 140 and 150 form the molding space S along with the first and the second cores 110 and 120 and support the first core 110. The gate 160 is provided on a core block 140 to inject the resin into the molding space S. The gate 160 injects the resin from the resin supplier (not shown) through a runner 170 and a sprue 175 into the molding space S.

Figure 3:
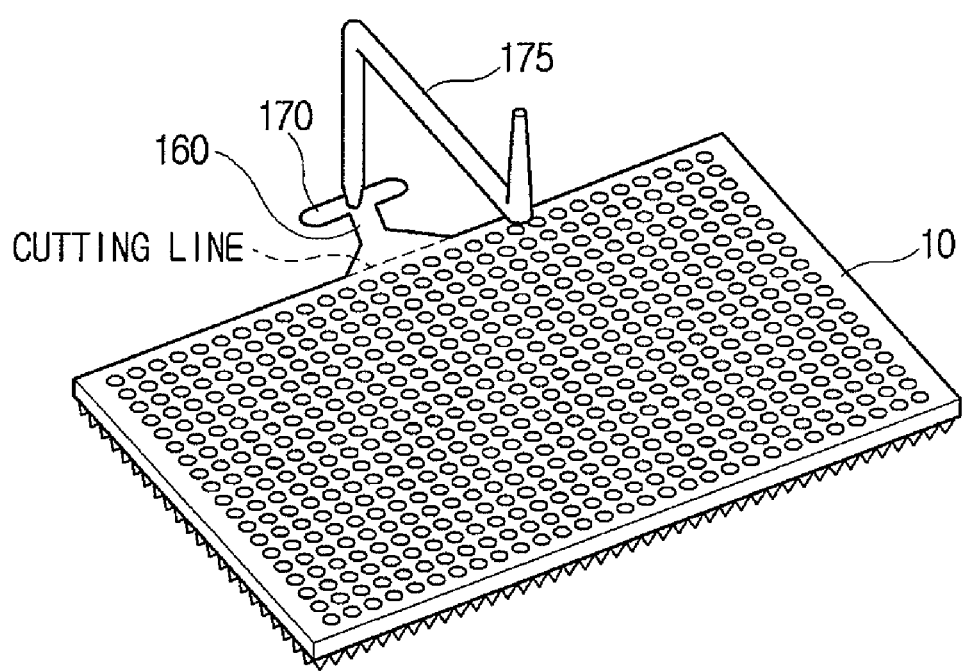
FIG. 3 is a perspective view of an injection product formed by the injection molding apparatus according to an exemplary embodiment of the present invention.

The resin is injected into the molding space S and solidified using the injection molding apparatus 100, and then the solidified resin is ejected, thereby obtaining the injection product 10 illustrated in FIG. 3. The ejecting pin (not shown) pushes up a lower part of the injection product 10 to eject the injection product 10 from the first core 110. After the injection product 10 is completely separated from the first core 110, a connecting part of the injection product 10 and the gate 160 is cut, thereby finishing the optical plate.

A mold for an optical plate according to an exemplary embodiment of the present invention is described with reference to FIG. 4.

Figure 4:
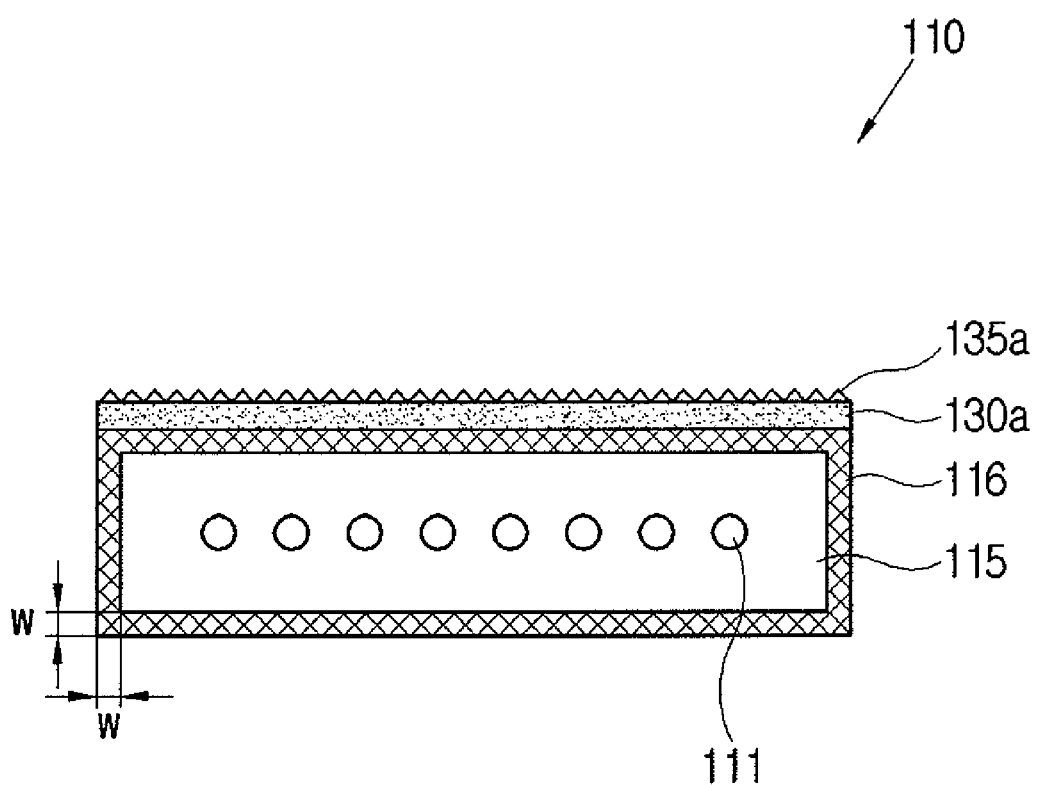
FIG. 4 is a sectional view of a mold for an optical plate according to an exemplary embodiment of the present invention.

Referring to FIG. 4, a mold for an optical plate according to an exemplary embodiment of the present invention comprises a core 110 including a body 115 and a ceramic layer 116 to cover the body 115. The ceramic layer 116 is provided as a heat insulation member to constantly maintain the temperature of resin in the overall molding space S. The body 115, as a heat treatment core, may comprise, for example, STAVAX, NAK55, NAK80 or prehardened steel. A specular layer 130a and a pattern forming part 135a according to an exemplary embodiment are formed on one surface of the ceramic layer 116. The ceramic layer 116 is formed by fusing ceramic powder mixed with a binder and depositing a mixture of the ceramic powder and the binder on a surface of the body 115 at high pressure. The ceramic layer 116 may be about 0.1 mm to about 1 mm in thickness w. If the thickness w of the ceramic layer 116 is less than 0.1 mm, the ceramic layer 116 does not function as a heat insulation member properly. If the thickness w of the ceramic layer 116 is more than 1 mm, it takes long time to form the ceramic layer 116.

Figure 5:
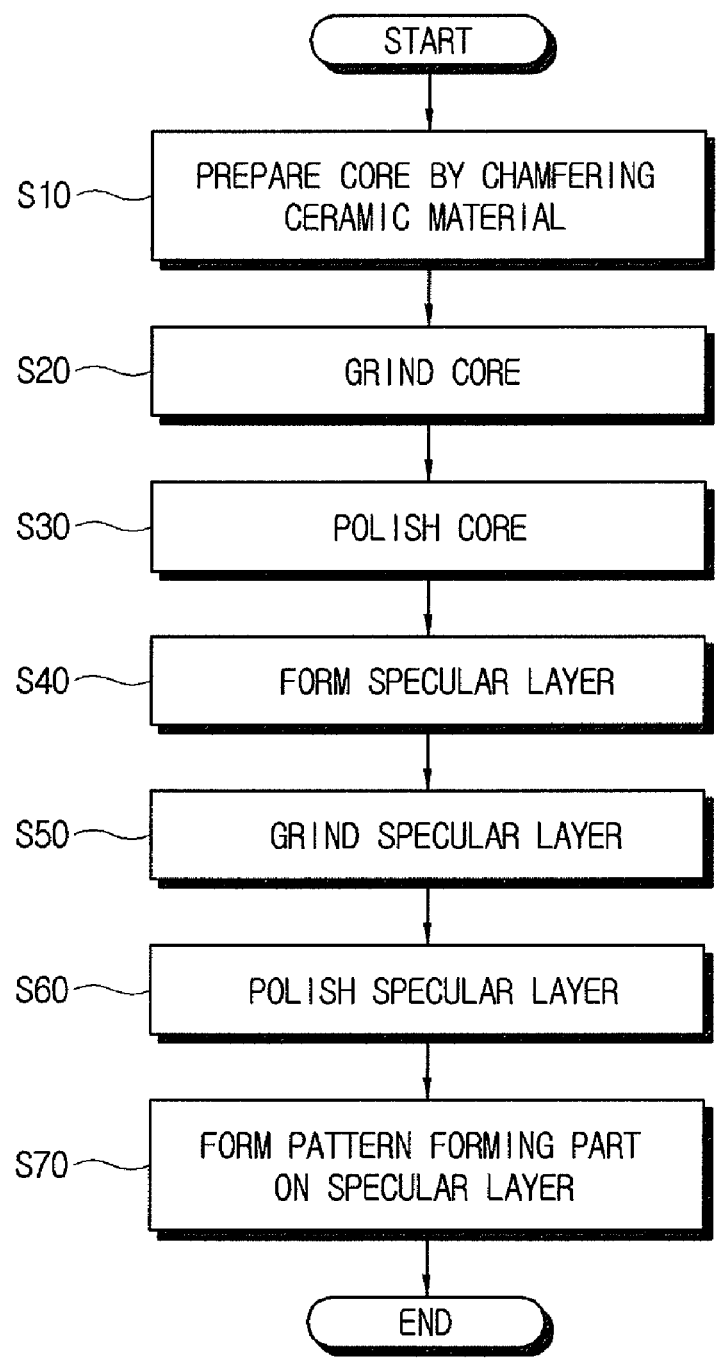
FIG. 5 is a flow chart to illustrate a method of manufacturing a mold for an optical plate according to an exemplary embodiment of the present invention.

A method of manufacturing a mold for an optical plate according to an exemplary embodiment of the present invention is described with reference to FIG. 5.

A ceramic material is chamfered to form a core with a predetermined shape (S10). Chamfering is a process to cut a ceramic material and to process cut surfaces, edges or slant surfaces.

At least one surface of the chamfered core is ground (S20). Grinding is a process to cause chamfered surfaces to be flat and fine surfaces. In an exemplary embodiment, a surface of the core 110 to face the molding space S is ground.

The ground surface of the core 110 is polished (S30). Polishing is a process to polish the ground surface of the core 110 to be a fine surface without outward defects. Accordingly, the surface of the core is processed to be a substantially flat and smooth surface.

Chamfering, grinding and polishing described above are pre-processes to form a specular layer 130a which has a surface of high performance.

The specular layer 130a is formed on the polished surface of the core 110 (S40). The specular layer 130a includes metal and may be formed by, for example, plating or vapor deposition. In an exemplary embodiment, the specular layer 130a may include gold (Au), silver (Ag), aluminum (Al), copper (Cu) and nickel (Ni). The specular layer is about 200 μm to about 300 μm in thickness r.

The specular layer 130a is ground (S50). Then, the ground specular layer 130a is polished (S60), thereby completing the specular layer 130a with a substantially flat surface. Grinding and polishing the specular layer 130a may be repeated more than twice, and forming the specular layer may be repeated more than twice.

When the specular layer 130a is completed, a pattern forming layer 135a is formed on the specular layer 130a (S70). This process may be omitted. A method of forming the pattern forming layer 135a on the specular layer 130a may be provided with a method of adhering a pattern forming layer 135a prepared by an injection or pressing process to the specular layer 130a.

Accordingly, a mold for an optical plate which may minimize outward defects of the injection product is completed.

An optical plate made by a mold for an optical plate according to an exemplary embodiment of the present invention is described with reference to FIG. 6. The optical plate includes, for example, a light guiding plate 223 and a diffusing plate (not shown).

The LCD displays desired images with liquid crystal molecules arranged in a matrix where transmittance of light is adjusted according to image signal information and forms the images on an LCD panel 210 using the light irradiated from a backlight unit 220.

Figure 6:
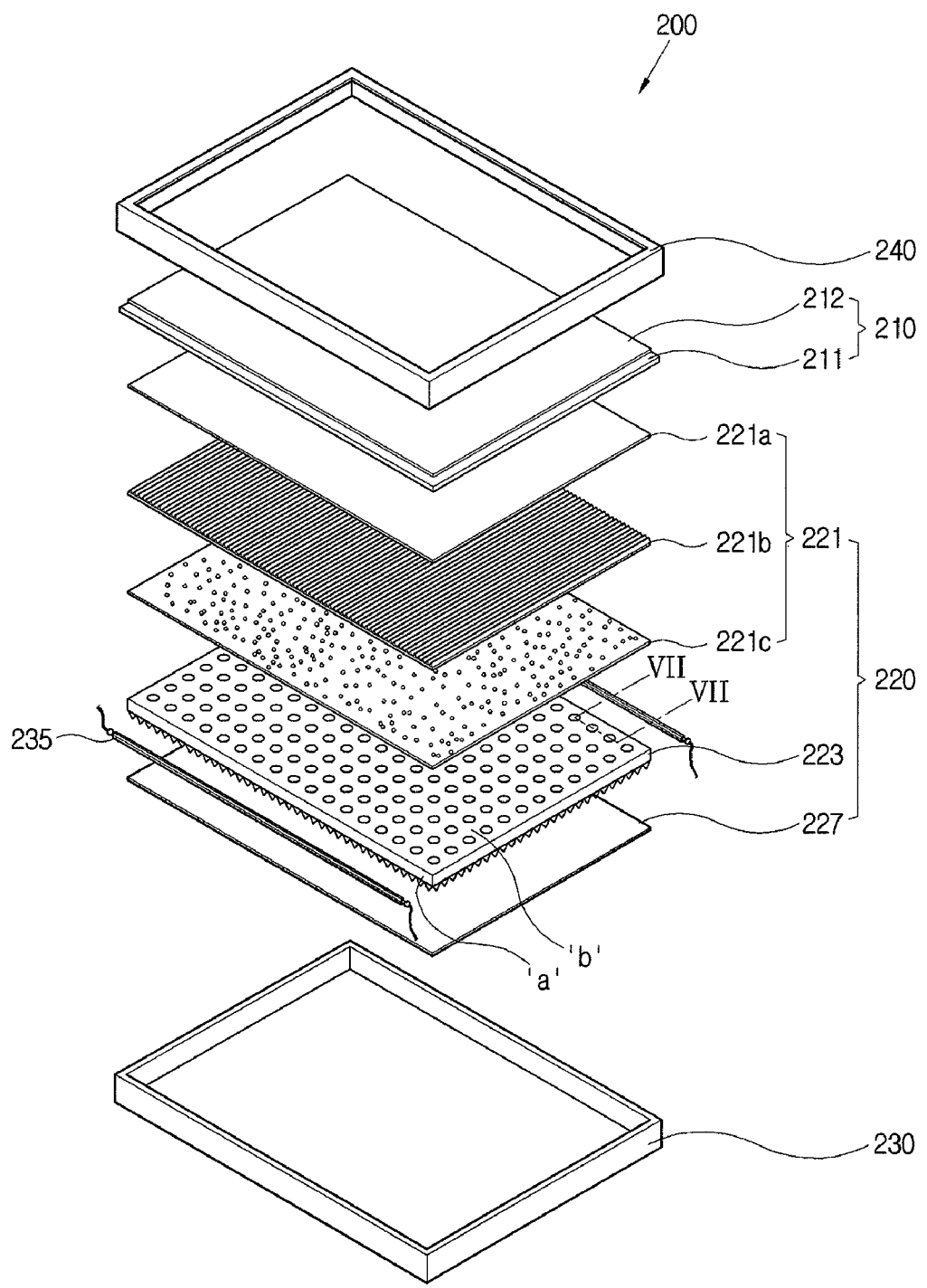
FIG. 6 is an exploded perspective view of a liquid crystal display according to an exemplary embodiment of the present invention.

Referring to FIG. 6, a liquid crystal display (LCD) 200 comprises the LCD panel 210 where the liquid crystal molecules formed in pixel units are arranged in the matrix, the backlight unit 220 to uniformly provide light to the LCD panel 210, and a lower cover 230 and an upper cover 240 which are combined to accommodate the LCD panel 210 and the backlight unit 220 therein.

The LCD panel 210 comprises a thin film transistor (TFT) substrate 211, a color filter substrate 212 disposed opposite the TFT substrate 211, and a liquid crystal layer (not shown) disposed between the two substrates 211 and 212. A plurality of TFTs and a plurality of signal lines to receive a driving signal from the outside are provided on the TFT substrate 211. A red, a green and a blue filters are formed on the color filter substrate 212 and receive the light from the backlight unit 220. The LCD panel 210 comprises the liquid crystal molecules in pixel units arranged in the matrix and displays images thereon by adjusting transmittance of light in the liquid crystal molecule according to the driving signal delivered from a driving part (not shown).

The backlight unit 220 comprises an optical sheet 221 disposed behind the LCD panel 210, the light guiding plate 223 to provide light uniformly to the backside of the LCD panel 210, a light source 235 disposed at a lateral side of the light guiding plate 223, and a reflective sheet 227 disposed behind the light guiding plate 223.

The optical sheet 221 comprises a protection sheet 221a, a prism sheet 221b and a diffusion sheet 221c. The protection sheet 221a protects the prism sheet 221b which is vulnerable to scratches. The prism sheet 221b focuses light diffused in the diffusion sheet 221c in a perpendicular direction to a surface of the LCD panel 210. The diffusion sheet 221c diffuses the light from the light source 235 to be provided to the LCD panel 210.

The light guiding plate 223 can be the injection product 10 with a predetermined thickness which is manufactured by the injection molding apparatus 100 according to an exemplary embodiment of the present invention.

The light guiding plate 223 is approximately a rectangular-shape and disposed behind the LCD panel 210 to guide the light from the light source 235 to the backside of the LCD panel 210. The light guiding plate 223 comprises an incident surface a to receive the light from the light source 235, an exiting surface b extending from the incident surface to face the LCD panel 210, and a rear surface c (see FIG. 7) on which a pattern is formed so that the light irradiated from the light source 235 to the incident surface a progresses to the exiting surface b. The light guiding plate 223 converts the light which is irradiated from the light source 235, disposed along one side of the light guiding plate 235 adjacent to the incident surface a, to the incident surface a into a plane light and deliver the light uniformly to the LCD panel 210 through the exiting surface b. The light guiding plate 223 may include acrylic resin having a high strength to thereby not easily be deformed or being broken and having a good transmittance. For example, Polymethylmethacrylate (PMMA), Polycarbonate (PC), Styrene acrylonitrile (SAN), and Methyl-styrene (MS) may be used. In an exemplary embodiment, the light guiding plate 223 may be formed in a wedge shape, that is a flat upper surface and a slant lower surface, or in a plate type, that is flat upper and lower surfaces. When an LCD is employed in a small-sized product such as a notebook PC or a cellular phone, a wedge-shaped light guiding plate 223 may be used and the light source 235 may be provided at a lateral toward which the light guiding plate 223 is thicker than the other.

The light guiding plate 223 has a predetermined thickness, a plurality of embossing or dot patterns formed on a surface toward the LCD panel 210 to spread light uniformly and efficiently to the backside of the LCD panel 210, and a plurality of prisms formed on another surface toward the lower cover 230.

Figure 7:
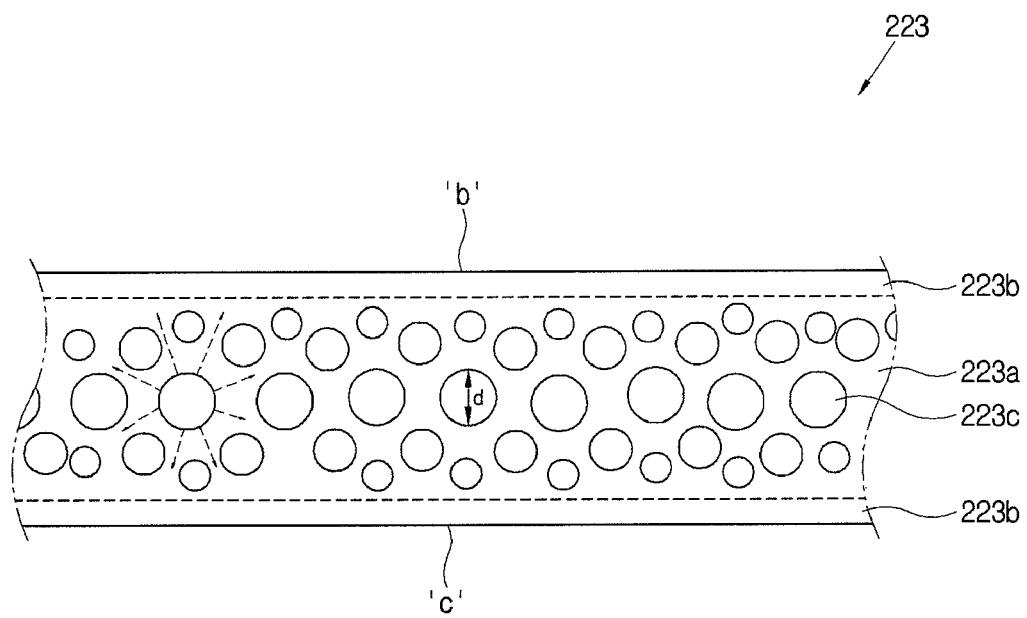
FIG. 7 is a sectional view of a light guiding plate taken along the line VII-VII in FIG. 6.

Referring to FIG. 7, the light guiding plate 223 comprises a core 223a, a surface layer 223b to cover the core 223a, and bubbles 223c dispersed in the core 223a. The core 223a and the surface layer 223b comprise substantially the same material and distinguished by the density of the bubbles 223c therein. The density of the bubbles 223c is lower in the surface layer 223b as compared with the density in the core 223a. The ratio of the density of the bubbles 223c in the surface layer 223b to the density of bubbles 223c in the core 223a is more than 1:100. The density used in the ratio is the number of the bubbles per unit area in the light guiding plate 223. The bubbles 223c can be about 5 μm to about 50 μm in diameter d on the average to efficiently diffuse the light from the light source 235. When the average diameter d of the bubbles 223c is less than 5 μm, the light may be diffused too much by a large number of small bubbles 223c so that brightness of the light may be reduced. When the diameter d of the bubbles 223c is more than 50 μm, fewer bubbles 223c are in the light guiding plate 223 so that the light may not be properly diffused.

The bubbles 223c are formed by injecting gas in a process of manufacturing the light guiding plate 223 and include at least one of carbon dioxide ($CO_2$) and nitrogen ($N_2$) therein. The light guiding plate 223 according to an exemplary embodiment has a flat and fine outward surface. Defects from traces of a flow of resin used for manufacturing the light guiding plate 223 or the bubbles 223c exposed on the surface of the light guide plate 223 are minimized on the surface layer 223b. The defects can be minimized because the specular layers 130a and 130b are formed on the first and the second cores 110 and 120 of the injection molding apparatus 100, and the first and the second cores 110 and 120 comprise ceramic with excellent heat-insulation performance characteristics. The weight of the light guiding plate 223 may be reduced by forming the bubbles 223c, and the bubbles 223c improve an optical performance of the light guiding plate 223.

The light source 235 is disposed adjacent to the incident surface a of the light guiding plate 223. The light source 235 generates light and includes, for example, a cold cathode fluorescent lamp (CCFL), an external electrode fluorescent lamp (EEFL) and a light emitting diode (LED).

The reflective sheet 227 reflects the light from the light source 235 to be provided toward the diffusion sheet 221c. The reflective sheet 227 may include, for example, Polyethylene terephthalate (PET) or Polycarbonate (PC).

The backlight unit 220 is accommodated in the lower cover 230 and assembled with the upper cover 240.

The upper cover 240 includes a display window to expose a display region of the LCD panel 210 to the outside and is assembled with the lower cover 230 to accommodate the LCD panel 210.

The optical plate comprises, for example, a light guiding plate and a diffusing plate.

Figure 8:
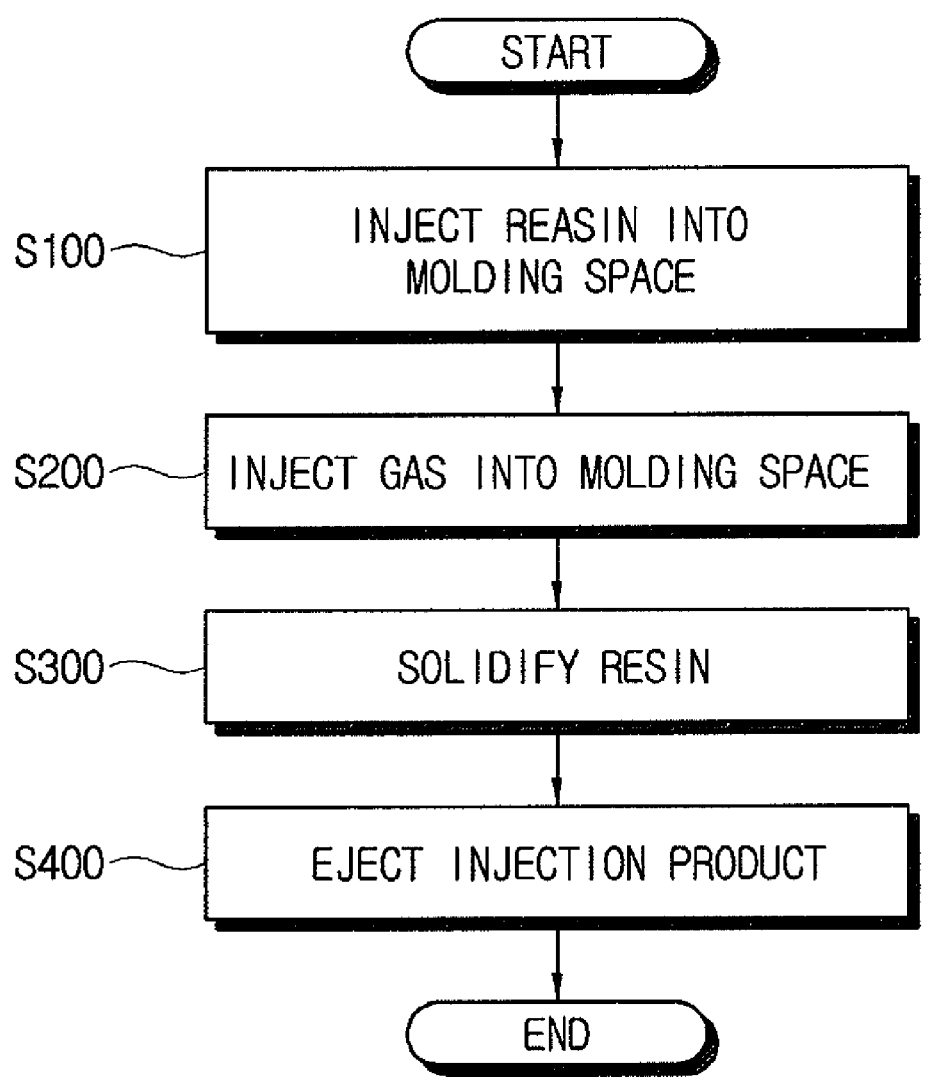
FIG. 8 is a flow chart to illustrate a method of manufacturing an optical plate according to an exemplary embodiment of the present invention.

Referring to FIG. 8, resin is injected to the molding space S in the injection molding apparatus according to an exemplary embodiment of the present invention (S100). The resin may include, for example, acrylic resin, Polymethyl-methacrylate (PMMA), Polycarbonate (PC), Styrene acrylonitrile (SAN) and Methyl-styrene (MS). The resin is injected through the resin supplier in the outside. In an exemplary embodiment, as the injection molding apparatus 100 comprises a core of ceramic with good heat-insulation characteristics, the temperature of the resin injected into the molding space S is maintained substantially uniformly throughout the molding space S. That is, the resin maintains the temperature uniformly while being injected. Thus, defects such as traces of the flow of the resin which is formed by a uniform solidification are minimized. In an exemplary embodiment, a temperature variation of the resin in the molding space S is within 10° C.

When the injection of the resin is finished, the gas is injected into the resin (S200). The gas is in the super critical state and may include any one of carbon dioxide and nitrogen. A mixed gas of the carbon dioxide and the nitrogen may be injected. A plurality of bubbles are formed by the gas in the resin.

Then, the resin is solidified (S300). The solidification of the resin may be performed more quickly by cooling water flowing in the coolant flow channels 111, 121. In an exemplary embodiment, the resin is solidified, maintaining its temperature uniformly overall by the core including ceramic. In an exemplary embodiment, as the specular layer 130a comprising metal is good thermal conductive material, the resin in contact with the specular layer 130a is quickly solidified, i.e., an external surface of the resin is quickly solidified. Accordingly, bubbles formed in the resin cannot be exposed to the external surface of the resin, thereby minimizing the outward defects of the light guiding plate 223 due to formation of the bubbles.

As the specular layer 130a is substantially smooth and flat, the resin contacting the specular layer 130a is substantially smooth and flat, and thus the light guiding plate 223 can have a fine outward. The existence of the bubbles reduces the resin in amount and weight, and improves the optical performance of the light guiding plate 223.

When the resin is completely solidified, the injection product 10 is ejected from the molding space S and cut along the cutting line, thereby completing the light guiding plate 223 (S400).

Exemplary embodiments of the present invention provide a mold for an optical plate and a manufacturing method thereof to minimize an outward defect of an injection product.

Exemplary embodiments of the present invention provide an optical plate and a manufacturing method thereof to minimize an outward defect and to improve an optical performance.

Although exemplary embodiments have been described with reference to the accompanying drawings, it is to be understood that the present invention is not limited to these precise embodiments but various changes and modifications can be made by one skilled in the art without departing from the spirit and scope of the present invention. All such changes and modifications are intended to be included within the scope of the invention as defined by the appended claims.

What is claimed is:

1. A mold for an optical plate comprising:
   a first core having a first surface;
   a second core having a second surface, wherein the second core formed opposite the first core, wherein the first surface and the second surface define a molding space; and
   a specular layer formed on at least one of the first surface and the second surface, wherein at least one of the first core or the second comprises a body and a ceramic layer to cover the body, and the specular layer is formed on the ceramic layer.

2. The mold for the optical plate according to claim 1, wherein the specular layer comprises metal.

3. The mold for the optical plate according to claim 2, wherein the specular layer comprises at least one of gold, silver, aluminum, copper or nickel.

4. The mold for the optical plate according to claim 2, wherein the specular layer is about 200 μm to about 300 μm in thickness.

5. The mold for the optical plate according to claim 2, wherein a surface of the specular layer facing the molding space is substantially flat.

6. The mold for the optical plate according to claim 2, wherein at least one of the first core or the second core comprises ceramic.

7. The mold for the optical plate according to claim 2, wherein a coolant flow channel is provided in at least one of the first core or the second core.

8. The mold for the optical plate according to claim 2, further comprising a pattern forming part formed on the specular layer.

9. The mold for the optical plate according to claim 8, wherein a grooved dot pattern or a grooved prism is formed on the pattern forming part.

10. The mold for the optical plate according to claim 2, further comprising a pair of core blocks which is disposed at a lateral side of the first core and the second core.

11. The mold for the optical plate according to claim 10, further comprising a gate to inject resin to the molding space, wherein the gate is provided at least one of the pair of core blocks.

* * * * *